A. T. ADAMS.
ELEVATOR DRAG.
APPLICATION FILED APR. 29, 1912.
1,049,327.
Patented Jan. 7, 1913.
2 SHEETS—SHEET 2.
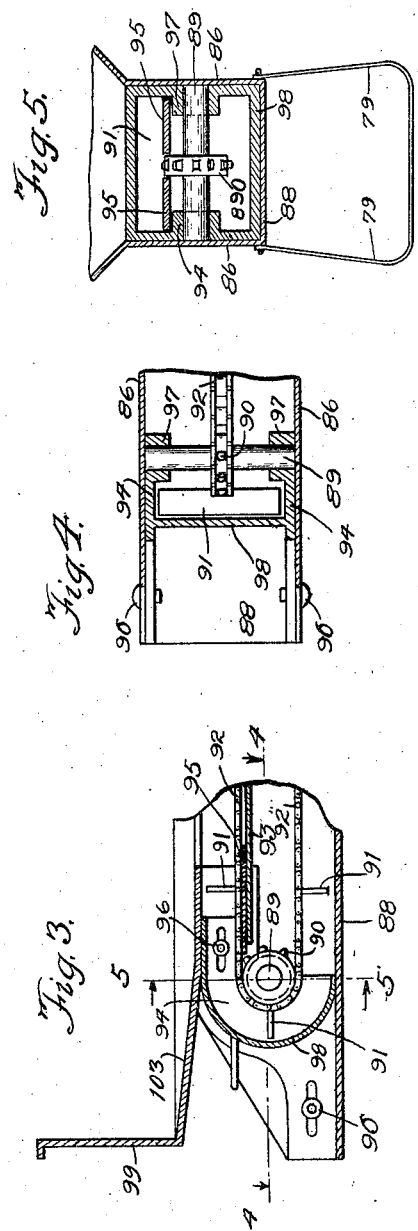
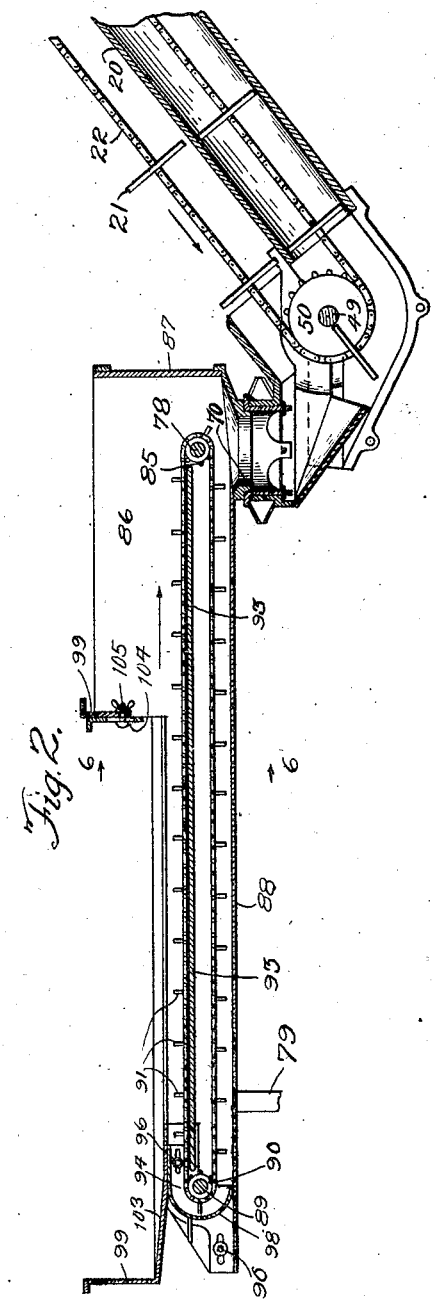
WITNESSES:
L. B. Graham
Milton Lenoir
INVENTOR:
A. T. Adams
J. McRoberts
his Atty.

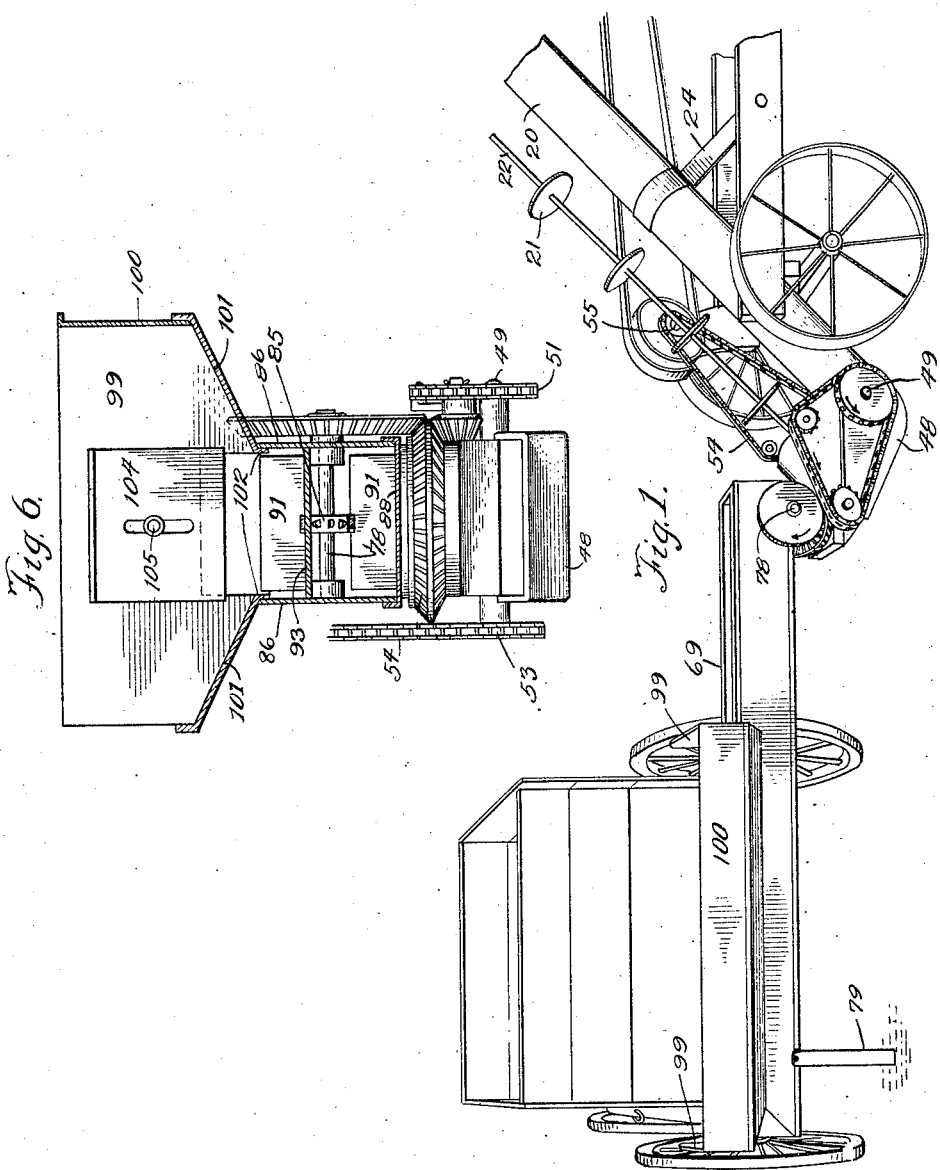

UNITED STATES PATENT OFFICE.

ALONZO T. ADAMS, OF MOLINE, ILLINOIS, ASSIGNOR TO MARSEILLES COMPANY, OF EAST MOLINE, ILLINOIS, A CORPORATION OF ILLINOIS.

ELEVATOR-DRAG.

1,049,327.     Specification of Letters Patent.     Patented Jan. 7, 1913.

Continuation of application Serial No. 485,640, filed March 25, 1909. This application filed April 29, 1912. Serial No. 693,920.

*To all whom it may concern:*

Be it known that I, ALONZO T. ADAMS, a citizen of the United States, residing at Moline, in the county of Rock Island and State of Illinois, have invented certain new and useful Improvements in Elevator-Drags, of which the following is a specification, reference being had therein to the accompanying drawing.

My invention relates to that class of cross-conveyers or drags for elevators used to elevate grain and other materials to bins, cars or other places, and adapted to be swung into position behind the wagon to receive the grain from it.

The invention relates to certain novel features of construction and arrangement of parts hereinafter fully disclosed and then pointed out in the appended claims.

In the accompanying drawings illustrating a practical embodiment of my invention Figure 1 is a side view of the front portion of an elevator with a receiving hopper or drag exemplifying my invention and swung into position behind the wagon shown in position to discharge its load into the hopper; Fig. 2 is a central longitudinal sectional view through the associated ends of the elevator and hopper; Fig. 3 is a vertical longitudinal view in detail through the outer or free end of the hopper; Fig. 4 is a horizontal longitudinal sectional view on the line 4—4 of Fig. 3; Fig. 5 is a vertical cross sectional view on line 5—5 of Fig. 3, and Fig. 6 is a vertical cross sectional view on line 6—6 of Fig. 1.

The elevator comprises a tubular mast 20 having an endless-conveyer composed of buckets or flights 21 connected by a suitably driven chain 22, and provided with a boot at its intake end, the elevator being mounted on its base or support by a swinging frame 24 and raised or lowered by any suitable means preferably those disclosed in my co-pending application filed March 25, 1909, Serial No. 485,640, of which the present application is a division. The boot 48 is provided with a shaft 49 provided with a sprocket wheel 50 in the boot to drive the conveyer and at one end with a sprocket wheel 51 and at the other with a sprocket wheel 53 driven by a sprocket chain 54 from a driving shaft 55.

The grain is fed into the inlet in the top of the boot-cover by a suitable receiving hopper 69 one end of which is supported in adjustable and detachable relation to the boot, and with such arrangement that the drive of the conveyer in the mast also drives the drive shaft 78 of the conveyer in the hopper when the latter is in position on the boot, these parts being the same as and forming part of the invention claimed in my aforesaid application. The hopper is provided at its free end with a skidding leg or support 79 which is rounded on both sides to allow the same to slide or skid over the ground when the hopper is swung in either direction and which may be folded down upon the bottom of the hopper when the latter is detached as for transportation or storage. The shaft 78 in the hopper is provided with a sprocket wheel 85 to drive the hopper-conveyer which moves in the direction of the arrow in Fig. 2.

The hopper may be of any suitable form and construction and in the present embodiment consists of a rectangular metal body having sides 86, rear end 87, and a flat bottom 88. The hopper also provides bearings for a front shaft 89 having the usual sprocket 90 for the conveyer. The conveyer is of any suitable form, and in the embodiment shown the flights 91 are connected by a sprocket chain 92 coöperating with the sprocket wheels 85 and 90, which are so located with reference to the bottom that the flights sweep over the upper face thereof in their travel between the shafts, the flights being substantially rectangular in contour and extending across the hopper. The hopper is provided with a horizontal shelf or partition 93 extending across the hopper for substantially its length in line with the upper portions of the sprockets 85 and 90 and cut away at its ends to receive the same. The flights 91 pass along this shelf 93 upon which the grain is dumped or deposited and feed the grain into the boot-inlet in the direction of travel of the flights 21 therethrough so that the flights pass down upon the grain in the boot.

The front shaft 89 of the hopper conveyer is supported preferably in a movable end section substantially as shown in Figs. 4, 5 and 6. In these figures the reference numeral 94 indicates an opposite pair of side plates resting against the inner faces of the sides 86 of the hopper and adjustable lengthwise of the hopper, being connected by a cross-plate 95 and held in adjusted position by any suitable means, such as the slot and bolt connections 96. The cross-plate 95 is located directly under the carrying run of the conveyer and overlaps and rests upon the shelf 93 and is suitably cut away to receive the sprocket 90. The side pieces provide bearings 97 for the front shaft 89 so that the end section acts as a tightener for the hopper conveyer by reason of its adjustability in the hopper. The end section also provides a return-throat for any grain that may have lodged upon the conveyer bottom 88. For this purpose the side pieces 94 also support a curved cross piece or deflector 98 extending across the width of the hopper in front of the sprocket 90 and curved substantially upon a segment of the circle described by the outer ends of the flights as they pass about the sprocket. This curved wall or deflector is flush with the bottom 88 and extends to a point substantially over the shelf 93, thereby furnishing a return throat so that any grain lodged upon the lower floor of the hopper is carried by the flights back up through the throat to the upper floor 93 of the hopper in position to be acted upon by the flights as they move toward the exit 70.

The hopper is provided with a reversible guide trough upon one side to receive the rear end of the wagon body when the latter is dumping the grain. This trough is shown in Figs. 1 and 6 and consists of an opposite pair of end walls 99 connected by a rear wall 100. The end walls are considerably wider than the cross-section of the hopper 69 in order to form a larger receiving area for the grain as it flows from the wagon, and the bottom of the trough is flared being composed of the oppositely sloping walls 101 extending inwardly toward each other and leaving a central opening of substantially the same width as the hopper, the sloping bottom walls being provided with flanges 102 adapted to set within the sides 86 of the hopper as shown in Fig. 6. The trough is preferably adapted to overhang and extend beyond the front end of the hopper as shown in Figs. 2 and 3, and is there provided with a supplemental inclined bottom piece 103 extending from the front end 99 to a point within the hopper. The opposite end of the trough is provided with a trimmer 104 adapted to be raised and lowered and held in position by a set screw 105, the lower edge of the trimmer being rounded so as not to interfere with the passage of the grain. The trough may be reversed upon the hopper so as to accommodate a wagon driving into position from either side of the elevator, the flanges 102 being adapted to set within the hopper in either position of the trough.

When the elevator is used the mast is swung to inclined position to deliver the grain at the desired point, and the receiving hopper is arranged to discharge into the boot as the grain is dumped therein. The shaft 49 is suitably driven to move the conveyer in the mast to elevate the grain from the boot to the upper discharge end. The hopper may be swung around out of the path of the loaded wagon to allow the latter to drive to position and then swung to position in rear of the wagon to catch the grain from the wagon end-gate and feed it to the boot.

I claim:—

1. In a device of the class described, a hopper having sides and one end and an intermediate shelf, a shaft journaled in the sides, an adjustable end-section having a cross-plate overlapping the shelf, and carrying a shaft, an endless conveyer on the shafts, and means to drive the conveyer.

2. In a device of the class described, a hopper having sides, an endless conveyer running therein in upper and lower runs, and a deflector forming a return-throat to co-act with the conveyer to carry material from the lower to the upper run.

3. In a device of the class described, a hopper having sides, a bottom and a longitudinal shelf, an endless series of conveyer flights running on suitable shafts and traveling over the bottom and shelf, and an adjustable end-section, a cross-plate on the shelf, and a plate curved to the path of the outer edges of the flights as they pass about a shaft and leading from the bottom to a point over the cross-plate.

4. In a device of the class described, a conveyer, an adjustable end-section, a shaft mounted in the end-section and provided with a wheel over which the conveyer travels, and a deflector carried by the end-section outside the conveyer and concentric with the travel thereof about its shaft.

5. In a device of the class described, a hopper and a conveyer carried thereby, and an adjustable deflector located at the end opposite to the discharge of the hopper and inside which the conveyer travels.

6. In a device of the class described, a hopper having a bottom and a longitudinal shelf, and provided with flights traveling over the bottom and shelf, and an end-section adjustably mounted on the hopper and having a deflector curved from the bottom to a point substantially over the shelf.

7. In a device of the class described, a hopper having a bottom and a longitudinal shelf, shafts journaled on the sides of the hopper at the ends of the shelf, a conveyer carried by the shafts and running over the bottom and shelf, and an adjustable deflector projecting from the bottom and curved to a point over the shelf.

8. In a device of the class described, a hopper having sides, and a flared trough having flanges fitting within the sides of the hopper, whereby the trough may be reversed.

9. In a device of the class described, a hopper having sides, a flared trough having flanges reversely fitting within the sides of the hopper, and a trimmer at one end of the trough.

10. In a device of the class described, a hopper having flared sides, a flared trough having flanges reversely fitting within the sides of the hopper and having a rear wall and side walls forming an open-sided box.

11. In a device of the class described, an elevator having a boot, a receiving-hopper revolubly connected at its inner end to the boot to swing horizontally to either side thereof, and a skidding-leg supporting its outer end.

In testimony whereof I affix my signature in presence of two witnesses.

ALONZO T. ADAMS.

Witnesses:
 G. P. ERTROM,
 W. B. McKAHIN.

Copies of this patent may be obtained for five cents each, by addressing the "Commissioner of Patents, Washington, D. C."